US005659623A

United States Patent [19]
Conrad

[11] Patent Number: 5,659,623
[45] Date of Patent: Aug. 19, 1997

[54] METHOD AND APPARATUS FOR ASSESSING THE QUALITY OF A SEED LOT

[75] Inventor: Robert Conrad, Wheaton, Ill.

[73] Assignee: Ball Horticultural Company, West Chicago, Ill.

[21] Appl. No.: 407,411

[22] Filed: Mar. 17, 1995

[51] Int. Cl.$^6$ ........................................................ G06T 7/60
[52] U.S. Cl. ........................................ 382/110; 382/286
[58] Field of Search .................................. 382/110, 286; 209/580, 939; 348/89

[56] References Cited

U.S. PATENT DOCUMENTS

| | | | |
|---|---|---|---|
| 4,125,400 | 11/1978 | Downer et al. | 504/357 |
| 5,130,545 | 7/1992 | Lussier | 250/458.1 |
| 5,253,302 | 10/1993 | Massen | 382/110 |

OTHER PUBLICATIONS

Maw et al. "Optical Methods for Detecting Seedlings." ASAE, pap #85–1086, 1985.

Bauchan, G. R. et al., "Use of Image Analysis System to Karyotype Diploid Alfalfa (Medicago satira L.)", *The Journal of Heredity*, 85(1): 18–22 (1994).

Blazquez, C.H., "Comparisons Between Densitometric Measurements, Image Analysis, and Photointerpretation Readings of Aerial Color Infrared Photographs of Citrus Trees," Proceedings of the One Hundres First Annual Meeting of the Florida State Horticulture Society, held at Miami, Florida, Nov. 1–3, 1988.

Botha, C.E.J., et al., "The Ultra Structure and Computer Enhanced Digital Image Analysis of Plasmodesmata at the Kranz Mesophyll–Bundle Sheath Interface of *Themeda triandra* var. *imberbis* (Retz) A. Camus in Conventionally-fixed Leaf Blades," *Annuals of Botany*, 72: 255–261 (1993).

Draper, S.R. et al., "Preliminary Observations with A Computer Based System for Analysis of the Shape of Seeds and Vegetative Structures," *J. Nata. Inst. Agric. Bot.* 36: 387–395 (1984).

Draper S.R., et al., "Machine Vision for the Characterization and Identification of Cultivars," Plant Varieties and Seeds 2: 53–62 (1989).

Furman, K.C. et al., "Interfacing and ASAC–1000 Seed Analyzer with an IBM–PC Microcomputer using the Basic Program ASACSTAT," *J. of Seed Tech.* 11: 79–87 (1987).

Harms, G.A., "Automated Quantifiaction of Roots Using a Simple Image Analyzer," *Agron. J.* 81: 935–938 (1989).

He, W.B. et al., "Processing of Living Plant Images for Automatic Selection and Transfer," *Computers and Electronics in Agriculture*, 6: 107–122 (1991).

Keefe, P.D. et al., "An Automated Machine Vision System for the Morphometry of New Cultivars and Plant Genebank Accessions," *Plant Varieties and Seeds*, vol. 1, 1–11 (1988).

McCormac, A.C. et al., "A Modified Slant Board Test for Vigour Testing Brassicas," *Plant Varieties & Seeds*, vol. 3(2), pp. 81–87 (Jul., 1990).

McCormac, A.C. et al., "Automated Vigour Testing of Field Vegetables Using Image Analysis," *Seed Sci. & Technol.* 18: 103–112 (1990).

(List continued on next page.)

*Primary Examiner*—Joseph Mancuso
*Assistant Examiner*—Jon Chang
*Attorney, Agent, or Firm*—Marshall, O'Toole, Gerstein, Murray & Borun

[57] ABSTRACT

A method and apparatus for assessing the quality of a seed lot utilizes image analysis equipment to generate an indication of seed quality. In one method, the quality of the seed lot may be determined by generating an image of a plurality of seedlings grown from a plurality of seeds selected from the seed lot, determining the leaf surface area of each of the seedlings from the image, determining the total leaf surface area of the seedlings from the image, determining a surface area threshold relating to the leaf surface areas of a plurality of the seedlings, determining the proportion of the seedlings which have a leaf surface area that exceeds the surface area threshold, and generating an indication of seed quality based upon that proportion.

38 Claims, 14 Drawing Sheets

OTHER PUBLICATIONS

Moore, F.D., et al., "Probit Analysis: A Computer Program for Evaluation of Seed Germination and Viability Loss Rate," Technical Bulletin–Colorado State University Agriculture Experiment Station, 147: 1–7 (Feb. 1983).

Paul, G.C. et al., "Viability Testing and Characterization of Germination of Fungal Spores by Automatic Image Analysis," *Biotechnology and Bioengineering,* Jun. 5, 1993, vol. 42(1), pp. 11–23.

Pyke, K.A. et al., "Temporal and Spatial Development of the Cells of the Expanding First leaf of Arabidopsis thaliana (L.) Heynh," *J. of Exp. Bot.,* vol. 42 (244): 1407–1416 (Nov. 1991).

*QUIPS Reference Manual,* Leica Cambridge Ltd, Clifton Road, Cambridge England.

*Seed Vigor Testing Handbook,* Contribution No. 32 to the Handbook on Seed Testing Prepared by the Seed Vigor Testing Committee of the Association of Official Seed Analysts Published by the Association, 1983.

Smith, O.E. et al., "Studies on Lettuce Seed Quality: I. Effect of Seed Size and Weight Vigor," *J. of the Amer. Soc. for Hort. Sci.,* 98(6), 529–533 (1973).

Smuker, A.J.M. et al., "Image Anlysis of Video Recorded Plant Root Systems", ASA Special Publication–American Society of Agronomy, 1987(50), 67–80.

Tagliavini, M. et al., "Measuring Root Surface Area and Mean Root Diameter of Peach Seedlings by Digital Image Analysis," Hort Science: A Publication of the American Society for Horticultural Sciensce, V.28(11), 1129–1130 (Nov. 1993).

Travis, A.J. et al., "A Computer Based System for the Recognition of Seed Shape," *Seed Sci. & Technol.* 13: 813–820 (1983).

Vanderburg, W.J. et al., "Predicting Tomato Seedling Morphology by X–ray Analysis of Seeds," *J. Amer. Soc. Hort. Sci.* 119(2): 258–263 (1994).

Wolfe, R.R. et al., "Measurement of Surface Areas of Interest Such as Bell Pepper Coloration Using Multiple Orthogonal Images," Transactions of the ASAE, vol. 35(5): 1723–1727 (Sep./Oct. 1992).

Wurr, D.C.E. et al., "A Determination of the Seed Vigor and Field Performance of Crisp Lettuce Seed Stocks," *Seed Sci. and Tech.,* 13: 11–17 (1985).

Keefe, P.D., "A Dedicated Wheat Grain Image Analyser", Plant Varieties and Seeds 5, 27–33 (1992).

Keefe, P.D. et al., "The Isolation of Carrot Embryos and Their Measurements by Machine Vision for the Prediction of Crop Uniformity", *J. of Hort. Sci.,* 61(4) 497–502 (1986).

Keys, R.D. et al., "Automated Seedling Length Measurement of Germination/Vigor Estimation Using A CASAS (Computerized Automated Seed Analysis System)", *J. of Seed Tech.* 9(1) 40–53 (1984).

McCormac, A.C. et al., "Cauliflower (Brassica oleracea L.) Seed Vigour: Imbibition Effects," *J. of Exp. Bot.* 41(228) 893–899 (1990).

Fig. 7A

```
Routine Header:
   Number of fields: 1
   Standard Frames

Image frame    ( x 0,  y 4,  Width 736,  Height 569 )
Measure frame  ( x 0,  y 3,  Width 736,  Height 570 )
Feature Histogram #1   ( Y Param Number, X Param CoincParam, from 0. to 300., linear, 8 bins )
+--------------- Image Setup
PauseText  ( "Position flat and ensure good focus" )
Image Setup   ( Camera 3, White 50, Black 50, Lamp 50 )

Select Lens   ( Macro, Lens 1, mag changer 1.0 x, 0.357782 millimetres per pixel )
Calibrate   ( 0.409982 millimetres per pixel )
Graphics   ( Grid, 15 x 10 Lines, Grid Size 700 x 450, Origin 30 x 64,
   Thickness 2, Orientation 0.000000, to Binary0 Cleared )
Binary Logical   ( copy Binary0 , inverted to Binary3 )
Binary Identify   ( EdgeFeat from Binary3 to Binary3 )
REACQUIRE:
PauseText   ( "Align the flat with the grid." )
Display  ( Live (on), frames (on,off), planes (0,off,off,off,off,off), lut 0, x 0, y 0, z 1, Reduction off )
Read Image [PAUSE]   ( from file C:\IMAGES\21R2-529.TIF into Colour0, type TIF )

REDETECT:

+--------------- Color detection
Convolute   ( from Colour0 to Colour0, Average, autocontrast off, normalisation Absolute)
PauseText   ( "Please detect the green leaves and click on OK." )
Colour Detect [PAUSE]   ( HSI+: 176-255, 37-247, 0-255, from Colour0 into Binary1 )

+--------------- Binary processing
Binary Identify   ( FillHoles from Binary1 to Binary1 )
Binary Amend   ( Open from Binary1 to Binary1, cycles 2, operator Disc, edge erode Off )

REEDIT:

*--------------------------- EDITING
Binary Identify   ( Outline from Binary0 to Binary5 )
Grey Util   ( Clear Colour1 to 0 )
Grey Util   ( Clear Colour2 to 255 )
Grey Util   ( Copy Colour1 to Colour2, masked by Binary5 )

Binary Edit [PAUSE]   ( Cut from Binary1 to Binary1, nib Fill, width 2 )
+--------------- Measurements
Clear Accepts
Clear Feature Histogram #1
COINC.PARAM = 101
COINC.MODE = 1
Measure feature   ( plane Binary1, 8 ferets, minimum area: 4, grey image: Colour0 )
   Selected parameters: Area, X FCP, Y FCP, XCentroid, YCentroid,
   CoincCount, CoincParam
MFEATINPUT = 3
FERETS = 8
MINAREA = 4
Feature Accept [PAUSE] :
   CoincCount from 1. to 1000000.
COINC.PARAM = 101
COINC.MODE = 1
Measure feature   ( plane MFEATINPUT, FERETS ferets, minimum area: MINAREA, grey image: FTRGREY.IMAGE
      feature counts into FTRCOUNT(2), results into FTRRESULTS(count,7) )
   Selected parameters: Area, X FCP, Y FCP, XCentroid, YCentroid,
   CoincCount, CoincParam
Copy Accepted Features   ( from Binary3 into Binary2 )

Feature Expression   ( CoincParam ( all features ), title Leaf Area = PCOINCPARAM(FTR) )

+--------------- Set-up results
HISTLOWLIM = 0
HISTBINS = 8
HISTUPLIM = 350
Feature Histogram #1   ( Y Param Number, X Param CoincParam, from HISTLOWLIM to HISTUPLIM,
      linear, HISTBINS bins, into HISTRESULTS(HISTBINS), stats into HISTSTATS(14),
      limits into HISTLIMITS(HISTBINS+1) )

*--------------- GET THE EATURE HISTOGRAM STATISTICS

THETOTAL = HISTSTATS(1)
THEMEAN = HISTSTATS(2)
THESTD = HISTSTATS(3)
THESTDERR = HISTSTATS(4)
```

```
THEMAX = HISTSTATS(5)
THEMIN = HISTSTATS(6)
THERANGE = HISTSTATS(7)
THEMEDIAN = HISTSTATS(8)
THEMODE = HISTSTATS(9)
THESKEWNESS = HISTSTATS(10)
THEKURTOSIS = HISTSTATS(11)
THEFEATURES = HISTSTATS(12)
THESPECAREA = HISTSTATS(13)
THENORMCOUNT = HISTSTATS(14)
TOTALPLANTS = FTRCOUNT(2)
CELLSCOUNTED = FTRCOUNT(1)

LOWERAREA = THEMEAN*.6
If ( (LOWERAREA<0) )
   LOWERAREA = 0
Endif
UPPERAREA = 350

+---------------Calculate germination percentage

If ( FTRCOUNT(1)>0 )
  GERM = 100*FTRCOUNT(2)/FTRCOUNT(1)
  BVI = ((THETOTAL/THESTD)*GERM/100)
Else
  GERM = -1
Endif
*........................SET UP FEATURE ACCEPT USING THE MEAN ECT.

FACCLOWLIM1 = LOWERAREA
FACCUPLIM1 = UPPERAREA
Feature Accept [PAUSE]:
   CoincParam from FACCLOWLIM1 to FACCUPLIM1

Copy Accepted Features  ( from Binary3 into Binary4 )
*........................REDO MEASURMENTS TO GET ACCEPTED/REJECTD
Clear Feature Histogram #1
MFEATINPUT = 4
FERETS = 8
MINAREA = 4
Measure feature  ( plane MFEATINPUT, FERETS ferets, minimum area: MINAREA, grey image: FTRGREY.IMAGE
      feature counts into FTRCOUNT(2), results into FTRRESULTS(count,7) )
   Selected parameters: Area, X FCP, Y FCP, XCentroid, YCentroid,
   CoincCount, CoincParam
YIELDPOTENTIAL = FTRCOUNT(1)

+---------------Calculate pas germination percentage

If ( FTRCOUNT(1)>0 )
  PASGERM = 100*YIELDPOTENTIAL/TOTALPLANTS
Else
  GERM = -1
Endif
+--------------- Display outline of germinated cells
Binary Identify  ( Outline from Binary4 to Binary4 )
Binary Logical  ( C = A OR B :  C Binary5, A Binary1, B Binary4 )
Grey Util  ( Clear Colour1 to 0 )
Grey Util  ( Clear Colour2 to 255 )
Grey Util  ( Copy Colour1 to Colour2, masked by Binary5 )
Display  ( Colour2 (on), frames (on,off), planes (off,off,off,off,off,off), lut 0, x 0, y 0, z 1, Reduction off )

Define Button  ( #1, "RE AQUIRE" )
Define Button  ( #2, "RE DETECT" )
Define Button  ( #3, "RE EDIT" )
Define Button  ( #4, "CONTINUE" )
Pause Message Group:
Pause  ( Buttons, "CHECK YOUR WORK" )
If ( BUTTON = 1 )
 Goto  REACQUIRE
Endif
If ( BUTTON = 2 )
 Goto  REDETECT
Endif
If ( BUTTON = 3 )
 Goto  REEDIT
Endif PauseText  ( "PLEASE ENTER THE SAMPLE ID" )
Input  ( SAMPID$ )
```

Fig. 7B

```
PauseText  ( "please enter THE LOT NUMBER" )
Input   ( LOT$ )
PauseText  ( "please enter the rep now" )
Input   ( REP$ )
PauseText  ( "please enter the test date now" )
Input   ( TESTDATE$ )
PauseText  ( "please enter the sow date now" )
Input   ( SOWDATE$ )
PauseText  ( "please enter the sku now" )
Input   ( SKU$ )
PauseText  ( "please enter the form now" )
Input   ( FORM$ )
PauseText  ( "please enter the supplier germ now" )
Input   ( SUPGERM$ )
PauseText  ( "please enter the supplier lot now" )
Input   ( SUPLOT$ )
PauseText  ( "please enter the ID " )
+----------------- Display results
Setup Output Window   ( "Germination Results", Move to x 981, y 191, w 282, h 414 )
Display Page
Display   ( "SAMPLE ID", tab follows )
Display   ( SAMPID$, no tab follows )
Display Line
Display   ( "LOT NUMBER", tab follows )
Display   ( LOT$, tab follows )
Display Line
Display   ( "REP", tab follows )
Display   ( REP$, tab follows )
Display Line
Display   ( "TEST DATE", tab follows )
Display   ( TESTDATE$, tab follows )
Display Line
Display   ( "SOW DATE", tab follows )
Display   ( SOWDATE$, tab follows )
Display Line
Display   ( "SKU", tab follows )
Display   ( SKU$, tab follows )
Display Line
Display   ( "FORM", tab follows )
Display   ( FORM$, tab follows )
Display Line
Display   ( "SUPPLIER GERM", tab follows )
Display   ( SUPGERM$, tab follows )
Display Line
Display   ( "SUPPLIER LOT", tab follows )
Display   ( SUPLOT$, tab follows )
Display Line
Display   ( "Germination:     ", tab follows )
Display   ( GERM, 2 digits after '.', no tab follows )
Display Line
Display   ( "BALL VIGOR INDEX ", tab follows )
Display   ( BVI, 0 digits after '.', tab follows )
Display Line
Display   ( " Pas Yield Potential Germ:", tab follows )
Display   ( PASGERM, 0 digits after '.', tab follows )
Display   ( "%", no tab follows )
Display Line
Display   ( "----------------------------------", tab follows )
Display Line
Display   ( "Total cells measured:", tab follows )
Display   ( CELLSCOUNTED, 0 digits after '.', tab follows )
Display Line
Display   ( "Total germinated cells:", tab follows )
Display   ( TOTALPLANTS, 0 digits after '.', tab follows )
Display Line
Display   ( "PAS YIELD POTENTIAL", tab follows )
Display   ( YIELDPOTENTIAL, field width: 3, left justified, 0 digits after '.', no tab follows )

Display Line
PauseText  ( "PRESS Ctrl PRINT NOW!...ENTER TO CONTINUE WITH NEXT FLAT!!" )
Pause  ( No dialog )
If  ( BUTTON = 4 )
  OPENFILE$ = SAMPID$
  CHAN = 1
  Open File   ( OPENFILE$, channel #CHAN )
  File   ( SAMPID$, channel #1, field width: 8, left justified )
  File Line   ( channel #1 )
  File   ( LOT$, channel #1, field width: 15, left justified )
  File Line   ( channel #1 )
  File   ( REP$, channel #1, field width: 2, left justified )
  File Line   ( channel #1 )
  File   ( TESTDATE$, channel #1, field width: 8, left justified )
```

```
File Line  ( channel #1 )
File  ( SOWDATE$, channel #1, field width: 8, left justified )
File Line  ( channel #1 )
File  ( SKU$, channel #1, field width: 15, left justified )
File Line  ( channel #1 )
File  ( FORM$, channel #1, field width: 3, left justified )
File Line  ( channel #1 )
File  ( SUPGERM$, channel #1, field width: 6, left justified )
File Line  ( channel #1 )
File  ( SUPLOT$, channel #1, field width: 10, left justified )
File Line  ( channel #1 )
File  ( BVI, channel #1, field width: 7, right justified, pad with zeroes, 0 digits after '.' )
File Line  ( channel #1 )
File  ( THETOTAL, channel #1, field width: 10, right justified, pad with zeroes, 4 digits after '.' )
File Line  ( channel #1 )
File  ( THEMEAN, channel #1, field width: 10, right justified, pad with zeroes, 4 digits after '.' )
File Line  ( channel #1 )
File  ( THESTD, channel #1, field width: 10, right justified, pad with zeroes, 4 digits after '.' )
File Line  ( channel #1 )
File  ( THESTDERR, channel #1, field width: 10, right justified, pad with zeroes, 4 digits after '.' )
File Line  ( channel #1 )
File  ( THEMAX, channel #1, field width: 10, right justified, pad with zeroes, 4 digits after '.' )
File Line  ( channel #1 )
File  ( THEMIN, channel #1, field width: 10, right justified, pad with zeroes, 4 digits after '.' )
File Line  ( channel #1 )
File  ( THERANGE, channel #1, field width: 10, right justified, pad with zeroes, 4 digits after '.' )
File Line  ( channel #1 ) .
File  ( THEMEDIAN, channel #1, field width: 10, right justified, pad with zeroes, 4 digits after '.' )
File Line  ( channel #1 )
File  ( THEMODE, channel #1, field width: 10, right justified, pad with zeroes, 4 digits after '.' )
File Line  ( channel #1 )
File  ( THESKEWNESS, channel #1, field width: 10, right justified, pad with zeroes, 4 digits after '.' )
File Line  ( channel #1 )
File  ( THEKURTOSIS, channel #1, field width: 10, right justified, pad with zeroes, 4 digits after '.' )
File Line  ( channel #1 )
File  ( CELLSCOUNTED, channel #1, field width: 10, right justified, pad with zeroes, 4 digits after '.' )
File Line  ( channel #1 )
File  ( TOTALPLANTS, channel #1, field width: 10, right justified, pad with zeroes, 4 digits after '.' )
File Line  ( channel #1 )
File  ( YIELDPOTENTIAL, channel #1, field width: 10, right justified, pad with zeroes, 4 digits after '.' )
File Line  ( channel #1 )
File  ( FACCLOWLIM1, channel #1, field width: 10, right justified, pad with zeroes, 4 digits after '.' )
File Line  ( channel #1 )
File  ( FACCUPLIM1, channel #1, field width: 10, right justified, pad with zeroes, 4 digits after '.' )
File Line  ( channel #1 )
Close File  ( channel #CHAN )
 Goto  REACQUIRE
Endif
END
```

METHOD AND APPARATUS FOR ASSESSING THE QUALITY OF A SEED LOT

FIELD OF THE INVENTION

The present invention provides a method for assessing the quality of a seed lot by determining the vigor rating of a sample of seedlings. The method employs the use of image analysis equipment, also known as machine vision, to determine the vigor rating.

BACKGROUND AND PRIOR ART

Seed Vigor Tests

In 1876, Nobbe in his "Handbook der Samenkunde" described his observations regarding the differences in seed vigor and "germination energy". Since that time, the nature and importance of seed vigor has increased steadily.

Today, the Vigor Test Committee of the Association of Official Seed Analysts has adopted the following definition of seed vigor: "Seed vigor comprises those properties which determine the potential for rapid uniform emergence and development of normal seedlings under a wide range of field conditions." *Seed Vigor Testing Handbook* Prepared by the Seed Vigor Testing Committee of the Association of Official Seed Analysts (1983).

Biologically, seed vigor is based on the genetic constitution of seeds which establishes their maximum physiological potential based on the fact that seeds begin to deteriorate at maturity and this deterioration proceeds until all of the seed tissues are dead. Id. The rate of deterioration, including loss of vigor, is determined not only by heredity, but also by events occurring during seed development, harvesting, conditioning, and storage. Id.

Several categories of seed vigor tests are known. These categories are: (1) seedling growth and evaluation tests (which are often referred to as "seedling vigor classification and seedling growth rate" tests); (2) stress tests; and (3) biochemical tests.

Germination Testing

In addition to vigor testing, germination testing is frequently conducted to determine seed quality. Germination (in laboratory practice) is defined by the AOSA as, "the emergence and development from the seed embryo of those essential structures, which, for the kinds of seed in question, are indicative of the ability to produce a normal plant under favorable conditions." Id. Germination test results establish the maximum plant producing potential of seed lots and correlate quite well with emergence under favorable field conditions. Id.

Today, the germination test is the principal and accepted criterion for determining seed viability. The test results are typically obtained from seeds which have been placed under favorable germination conditions. Essentially, germination tests are made on artificial, standardized, essentially sterile media, in humidified, temperature controlled germinators for periods sufficiently long to permit rather "weak" seeds to germinate. Id. However, one problem with that prior art germination test is that it overestimates field emergence because rarely, if ever, are favorable conditions encountered in the field.

Another problem with the prior art germination test is that it is scaleless or dimensionless. Either a seed germinates or it does not. Thus, every germinable seed is by definition equal in plant producing ability. Id. The results of a germination test are expressed as a percentage from 1-100%. The problem with using such percentages is that it is very misleading. For example, a seed lot germinating 50% should produce the same stand as a seed lot germinating 100%, provided twice as many seeds are planted. Id. In a few situations it might, but mostly it will not.

Types of Vigor Tests a. Seedling growth and evaluating tests

Some vigor tests are conducted under the same conditions as the standard germination test, except seedling growth is measured or evaluated in a different way. Seedling growth and evaluation tests are generally inexpensive and relatively rapid. However, the drawbacks of these tests are that conditions are tough to standardize between laboratories and the seed analyst must be able to determine whether the seed has germinated.

The seedling vigor classification is similar to the standard germination test. The only difference between the two tests is that normal seedlings are further classified as "strong" or "weak". Id. A seedling is often characterized as weak if it is missing its primary root and/or cotyledon, if its hypocotyl has breaks, lesions, necrosis, twisting or curling. Id. In contrast, normal seedlings are characterized as "strong". Based on this test, seedlings are divided into those with deficiencies and those without deficiencies. While this test involves very little work, careless handling of the test can result in errors.

The seedling growth rate test involves a measurement of seedling growth. Under this test, seeds are germinated according to the standard germination test with a more specific moisture content of paper towels. Id. At the end of the germination period, seedling growth is measured. Id. Usually, linear growth and dry weight are determined. Seeds which produce a single straight shoot or root can be measured to determine linear growth. The seedling growth rate test suffers from four limitations: (1) the seedling measurement and the removal of cotyledons or other storage tissues prior to oven drying are relatively time consuming; (2) seedling elongation can be inherently different among cultivars; (3) rate of germination is affected by moisture and temperature; and (4) seed size affects hypocotyl growth in soybeans. Id.

b. Stress tests

Various types of stress tests are known. Some of the stress tests simulate stresses seeds encounter in the field. The theory behind a stress test is that under suboptimum or stressed conditions, high vigor seeds have a greater potential for emergence.

In the accelerated aging test, for example, seeds are placed in temperature of 40°-45° C. and nearly 100% relative humidity for various lengths of time, after which a germination test is conducted. This test is relatively inexpensive.

The cold test simulates early spring field conditions by providing high soil moisture and low soil temperature. Typically, seeds are placed in soil in a plastic box or in paper towels lined with soil and incubated at 10° C. for a specified period. Id. At the end of the cold period, the tests are transferred to a favorable temperature for germination. Id. The emergence percentage is considered as an indication of seed vigor. Id. However, one problem with the cold test is microorganisms. Microorganisms frequently cause seed decay, fungus and other problems. In addition, specific soil conditions are often difficult to standardize from laboratory to laboratory.

The cool germination test involves germinating seeds in darkness at constantly low temperatures, such as 18° C. for several days. Basically, this test is a type of seed exhaustion test. This test is also referred to as the slant board test, which has been used to predict the field vigor in lettuce, carrots, cauliflower seeds and cotton. See O. E. Smith et al., "Studies on Lettuce Seed Quality: I. Effect of Seed Size and Weight on Vigor," *J. Amer. Soc. Hort. Sci.* 98(b): 529–533 (1973). McCormac, A. C. et al., "Automated Vigour Testing of Field Vegetables Using Image Analysis," *Seed Sci. and Technol.* 18:103–112 (1990).

c. Biochemical Tests

Biochemical tests measure certain metabolic events in seeds that are associated with germination and can be used to assess vigor.

The tetrazolium test measures dehydrogenase enzyme activity. These enzymes reduce tetrazolium chloride salt, which is colorless, to form a water insoluble red compound, formazon, which "stains" living cells a red color. The dead cells remain colorless. See the *Seed Vigor Testing Handbook* Prepared by the Seed Test Committee of the Association of Official Seed Analysts (1983).

Conductivity tests involve measuring soak water conductivity. Low vigor seeds often have poor membrane structure and often leak. Seeds with such a poor membrane structure frequently lose electrolytes, such as amino acids and organic acids, when they imbibe water, thereby increasing the conductivity of the soak water.

Image Analysis

Image Analysis, which is also known as Machine Vision, is a computer based system that is being used in the plant industry. The most common components of an image analysis system are a camera, a frame-grabber to digitize the analogue image and store it in RAM, a computer to run image-processing, image analysis classification and user access software, and data output hardware such as a monitor and printer. See Draper, S. R. et al., "Machine Vision for the Characterization and Identification of Cultivars", *Plant Varieties and Seeds* 2:53–62 (1989). Image analysis provides a new way of studying and analyzing plants and seeds. For example, image analysis is being used to analyze and record the shape of plant organs and seeds. Draper, S. R. et al., "Preliminary Observations with a Computer Based System for Analysis of the Shape of Seeds and Vegetative Structures," *J. Nata. Inst. Agric. Bot.* 36:387–395 (1984). Travis, A. J. et al., "A Computer Based System for the Recognition of Seed Shape," *Seed Sci. & Technol.* 13:813–820 (1985). Image analysis is also being used to determine the shape and size of plants in order to help classify, characterize, identify, and register new plant varieties. See Keefe, P. D. et al., "An Automated Machine Vision System for the Morphometry of New Cultivars and Plant Gene Bank Accessions"; Draper, S. R. et al, "Machine Vision for the Characterization and Identification of Cultivars," *Plant Varieties and Seeds* 2:53–62 (1989).

Image analysis has also been used to help visually select healthy plantlets from an array of growing specimens and effect their transfer to separate growth pots. Once transferred to the separate growth pots, image analysis is used to continue to monitor the plantlets until they develop into salable specimens. See He, W. B., et al., "Processing of Living Plant Images for Automatic Selection and Transfer," *Computers and Electronics in Agriculture,* 6:107–122 (1991).

Image analysis is also being used in determining leaf anatomy. For example, leaf areas and leaf lengths have been measured using image analysis in leaves dissected from the wildtype *Arabidopsis thaliana.* See Pyke et al., "Temporal and Spatial Development of the Cells of the Expanding First Leaf of *Arabidopsis thaliana* (L.) Heynh", *J. of Exp. Bot.* 42:1407–1416 (1991).

Image analysis is also being used in vigor testing and germination testing. Image analysis has been used to measure the results of the slant board test, the accelerated aging test and the cold test. See Keys, R. D. et al., "Automated Seedling Length Measurement for Germination/Vigor Estimation Using ACASAS (Computerized Automated Seed Analysis System)," *J. of Seed Technol.* 9:40–53 (1984). McCormac, A. C. et al., "Cauliflower (*Brassica oleracea* L.) Seed Vigour: Imbibition Effects," *J. of Exp. Bot.* 41:893–899 (1990); McCormac, A. C. et al., "Automated Vigour Testing of Field Vegetables Using Image Analysis," *Seed Sci. & Technol.* 18:103–112 (1990).

The problem with the prior art seed vigor tests is that most of these tests are run under specific, controlled growing conditions or use chemicals to assess the vigor of the seedlings. Therefore, special manipulation of the seed must take place in order for the vigor rating of the seedlings to be determined.

In addition, most seed vigor and germination tests must be conducted by Registered Seed Technologists (RST). In order to become an RST, the following requirements, established by the Society of Commercial Seed Technologies, must be met:

1. Accumulate a minimum of 100 points from two or more of the following categories: (category C, D or C/D combination is mandatory).
   A. Accepted accredited courses in Botanical Science of Seed Technology—2 points for each earned quarter credit hour, 3 points for each earned semester credit hour. Maximum of 50 points allowed.
   B. Accepted seed schools—10 points for each week of verified attendance. Maximum of 20 points.
   An additional 5 points will be allowed in this category for full attendance at an AOSA-SCST Annual Conference. (Prior to taking the examination.)
   C. Training under direct supervision of a qualified Seed Technologist with approximately equal time in purity analysis and germination. 1 point for each 80 hours training. A minimum of 50 points required.
   D. Unsupervised testing experience in purity and germination under the guidance of a qualified tutor. 1 point for each 160 hours experience. Minimum of 25 points required.
   E. Combination of C and D with one (1) year minimum and 25 and 12.5 points minimum respectively in each category.
   F. Attendance at a Seed Testing Workshop. (Maximum of 10 points for verified attendance)
2. Submit to Board of Examiners at the time of examination a seed collection. (Minimum 150 kinds)
3. Attain passing grades in the prescribed examination.

Constitution and By-laws of the Society of Commercial Seed Technologies (1992)

The United States Department of Agriculture (USDA) supports and promotes this program. For example, in order for seed to be certified for export, an RST must have conducted the germination test.

The vigor rating of this invention does not require that the seeds be grown under specific, controlled growing conditions. Under this invention, the vigor rating can be determined on seedlings grown under any type of growing conditions. For example, the vigor rating of seedlings grown under optimum, greenhouse or outdoor conditions can be determined.

In addition, under the seedling growth rate test, every factor of growth (root size, leaf size, stem size, etc.) is measured as part of the test. The concept is that the lot that grows the most from day-to-day is the most vigorous. Under the present invention, the vigor rating is determined by testing the seedling at any stage of development as long as the leaves are present and they do not overlap.

Additionally, the prior art seed vigor and germination tests have required an RST to conduct the vigor testing. Thereupon, a grower growing a plug flat of trays has to locate an RST to determine the vigor rating of his seedlings. With the present invention, an RST is not needed. Instead, anyone can be trained to conduct the vigor testing of this invention.

Therefore, the present invention provides a means be which a grower can determine the vigor rating of a plug flat of seedlings grown under any kind of growing conditions and at any stage of development.

SUMMARY OF THE INVENTION

The present invention involves a method for assessing the quality of a sample seed lot for a particular crop. The quality of a seed lot is assessed by determining the vigor rating for that particular crop of seedlings. Once the quality of the seed lot is assessed, this assessment can be recorded.

In order to determine the vigor rating, seeds of a particular crop must be sown into a suitable medium sufficient to support growth. The seeds are grown in a plug flat or outdoors in a field. If the seeds are grown outdoors in a field, a photograph is taken of the seedlings at the appropriate stage of development in order to determine their vigor rating.

The seeds can be grown under optimum conditions, commercial conditions, outdoors, or in a home greenhouse. Thus, advantageously, with the present invention, the vigor rating determined is not dependent upon the growing conditions.

Image analysis equipment is employed to determine the vigor rating. The image analysis equipment is used to measure the total surface area of the leaves of the seedlings in a plug flat, petri dish, or photograph, the standard deviation of the leaf area of the seedlings, and the germination percentage of the seedlings. Once these measurements and calculations have been made, the vigor rating of the seedlings is determined by dividing the total surface area of the leaves by the standard deviation of the leaves multiplied by the germination percentage.

DESCRIPTION OF THE DRAWINGS

FIGS. 7A–7D illustrate an example of a computer program that can be programmed into a control computer in order to practice the method of this invention.

DESCRIPTION OF THE INVENTION

Figure 1:
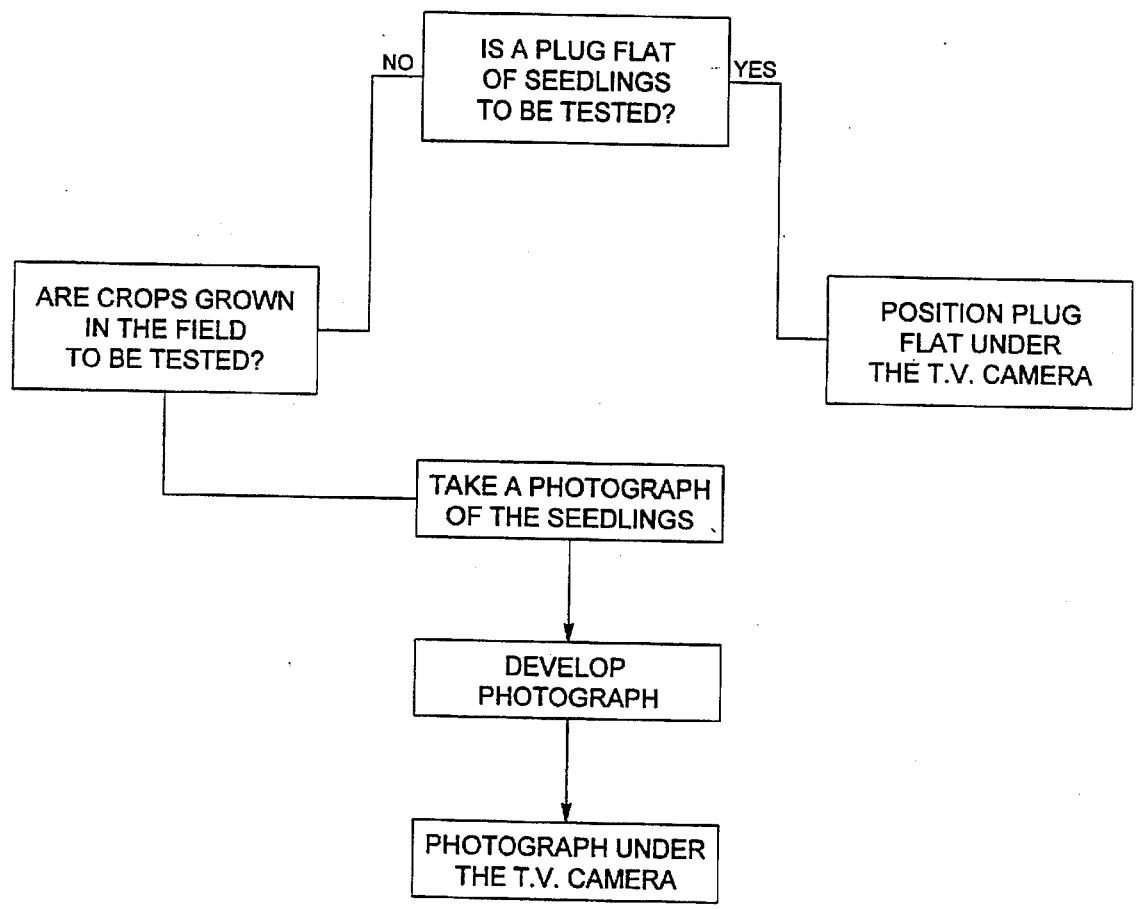
FIG. 1 is a flow chart of steps involved in placing the seedlings under a video camera.

The present invention involves a method for determining the vigor rating of a plug flat of seedlings. The vigor rating is determined using image analysis equipment.

The presently-determined vigor rating can be used to assess and label the quality of a sample seed lot for a particular crop of seedlings. Generally, the higher the vigor rating, the higher the quality of the seed lot. The vigor rating is important for commercial growers from an inventory control standpoint. Presumably, plug flats having a low vigor rating and thus a low seed lot quality would not be sold or used.

The vigor rating can also be used to compare the quality of a particular seed lot of a crop grown one year with the quality of a seed lot of the same crop grown in a different year or from a different location or commercial seed grower. Also, the vigor rating could be used to compare the quality of seed lot of a crop grown in one month (i.e. December) and the quality of a seed lot of the same crop grown several months later (i.e. April of the next year).

In order to determine the vigor rating of a sample plug flat of seedlings and eventually the quality of a particular seed lot from which the seedlings were taken, seeds are preferably sown into a plug flat. A plug flat or tray is a growing tray constructed out of a polymer, plastic or wood. The plug flat is divided into compartments of a certain size called "cells" in which a medium capable of supporting plant growth is inserted. Typically, plug flats are 11×22 inches long, for example, and typically contain anywhere from 80 to 800 cells. Seeds are then sown into the medium. The medium used in the plug flat can be any type of medium such as soil, peat moss, water or gel. If water or gel is used, the medium must be supplemented with sufficient nutrients to support seedling growth. However, the preferred medium is peat moss—vermiculite—perlite commercial growing medium, such as Sunshine #5, available from Florist Products, Inc., Schaumburg, Ill.

It is preferred that the seeds be sown and grown in a plug flat. However, seeds not grown in a plug flat can also be tested. For example, the quality of seed lots grown in a field or home garden can also be determined. For seeds grown in such non-controlled environments, a photograph, such as slide or a digital image, such as a video tape, is taken of the seedlings at the appropriate stage of development. The photograph or digital image is then used for vigor analysis testing purposes in lieu of the plug flat during the testing. Also, seeds grown in a lab in a test tube or petri dish can also be evaluated.

Any type of seeds can be tested by using the present invention. For example, seeds of flowering plants such as petunias, pansies or impatiens can be used. Vegetable seeds such as cucumbers, beans, lettuce or peppers can be used. Fruit seeds such as strawberries, tomatoes, pumpkins, apples and oranges can be used. Agricultural crop seeds such as corn, wheat and barley can be used. Grass and turf seeds can be tested provided they are captured at the proper stage of development. Grass and turf can be evaluated in a digital format. For example, the vertical orientation of the seedling from the soil to the tip of the seedling could be used for obtaining the image. Additionally, pregerminated or nongerminated seeds can be used.

Once sown, the seeds are grown under any type of growing conditions. For example, the seeds can be grown under optimum conditions, or under commercial greenhouse conditions, or grown outside in gardens or fields, or in a home greenhouse, etc. However, regardless of where the seeds are grown, sufficient water, aeration, oxygenation, and lighting should be provided so that the seeds will germinate.

The conditions under which the seedlings are grown does not affect the vigor rating. Regardless of the conditions under which the seedlings are grown, the vigor rating can be used to determine which seed lots are the most vigorous. For example, a group of seed lots grown under optimum conditions can be tested followed by a flat grown under normal outdoor conditions. This variation in testing conditions is unique in the field of vigor testing. The vigor tests disclosed in the prior art involved determining the vigor of plants grown only under suboptimum or stressed growing conditions. According to these tests, the growing conditions were considered quite significant. However, the vigor rating of this invention is not dependent upon growing conditions.

Once the seedlings appear and the leaves fold outward, the vigor rating can be determined. It is preferred that the vigor rating be determined before the leaves form a canopy or begin to overlap to any significant extent, so that accurate results can be achieved.

The vigor rating is determined using image analysis equipment. The image analysis equipment performs a series of measurements and calculations which are eventually used to determine the vigor rating for the sample seeds, and hence, for the associated seed lot. The image analysis or machine vision equipment preferably comprises of a control computer, a control monitor, a video camera and software. Other equipment that facilitates the testing, such as color modules, image memory, expansion modules, etc. can be used.

Figure 1A:
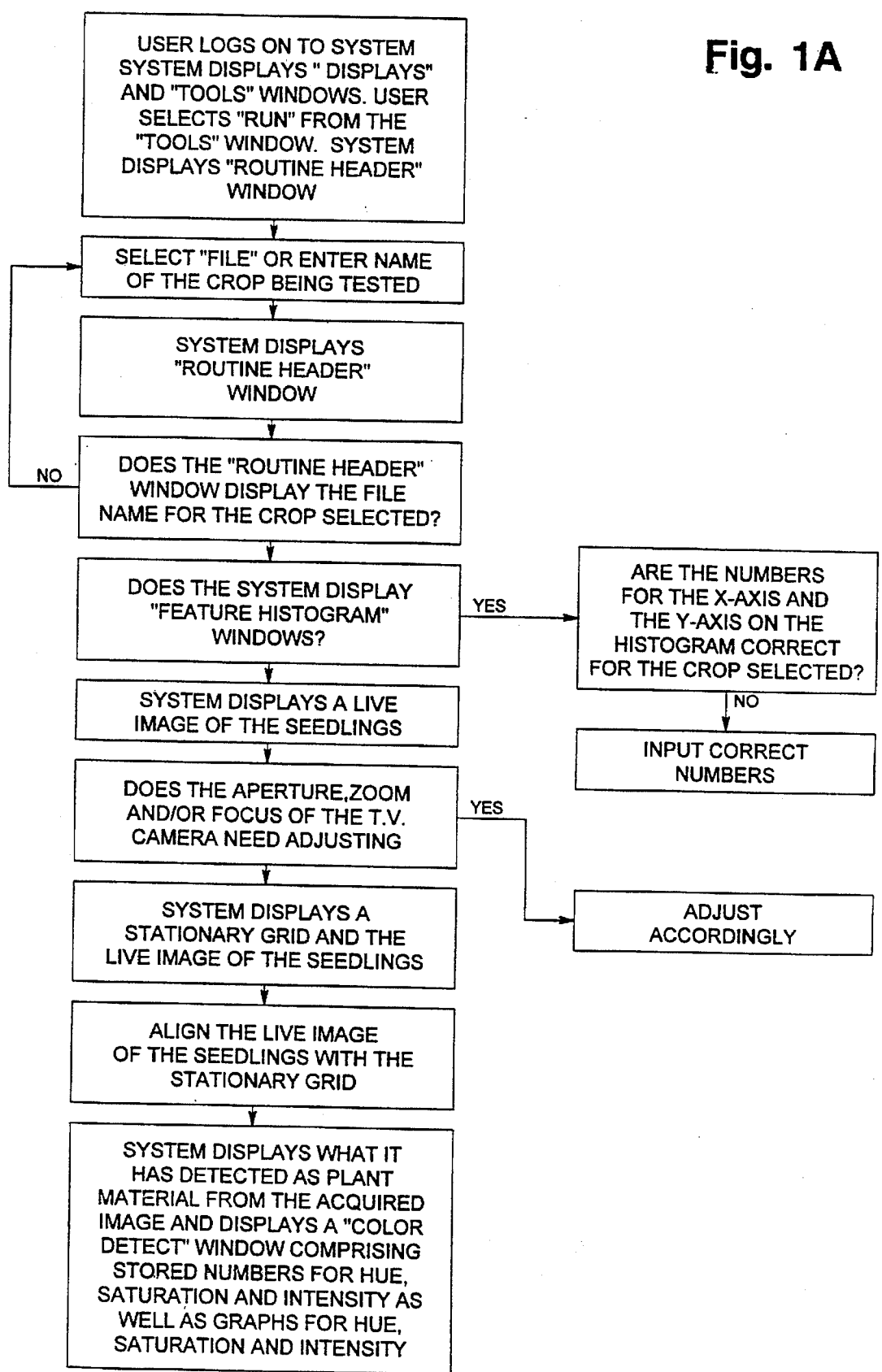
FIGS. 1A and 1B illustrate a flow chart of the relevant portion of the computer program used in conjunction with the image analysis equipment, more specifically, a control computer, to determine the vigor rating of a sample plug flat of seedlings. The individual conducting the vigor testing works with a control computer to determine the vigor rating.
Figure 1B:
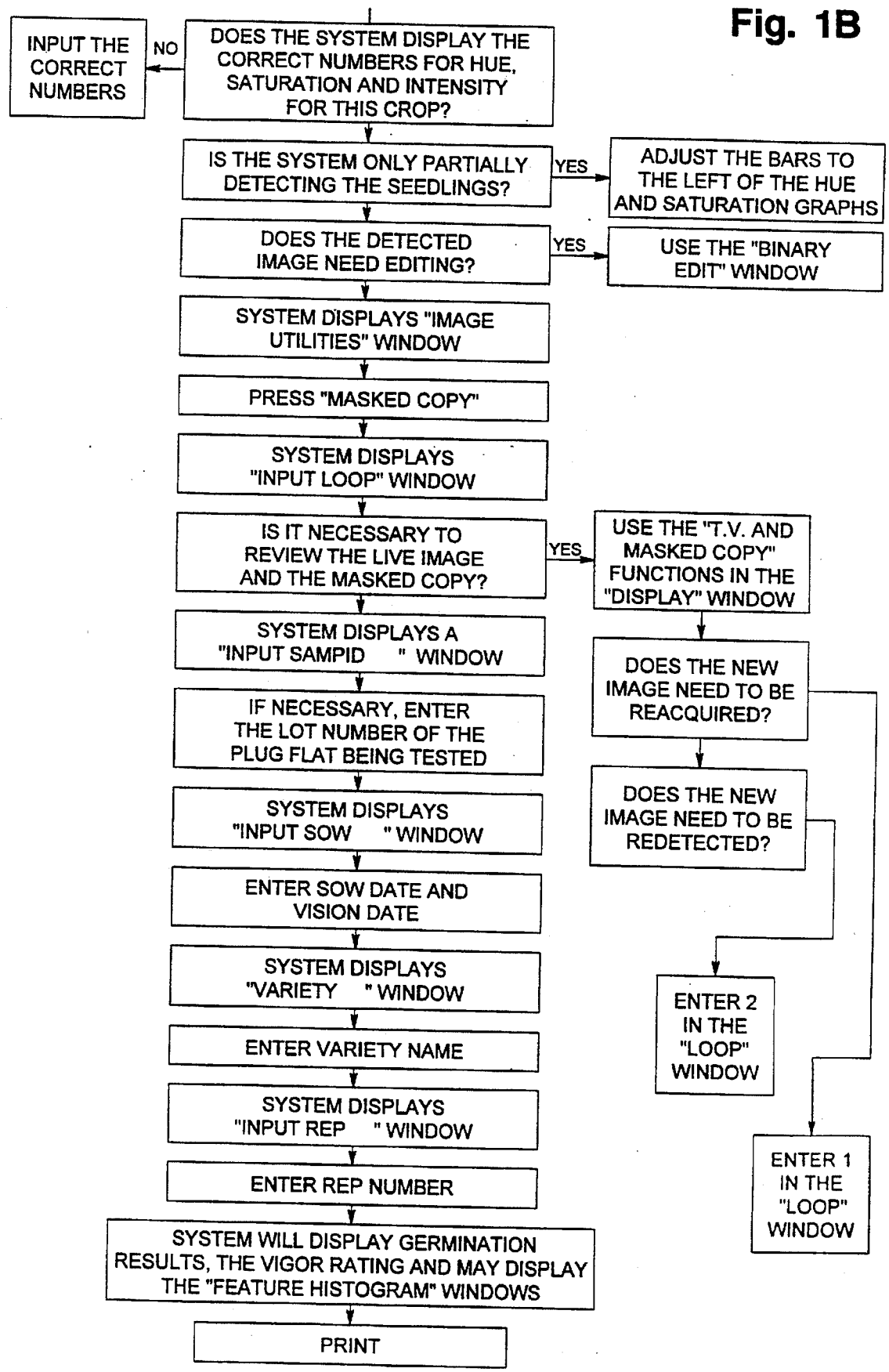
Figure 1C:
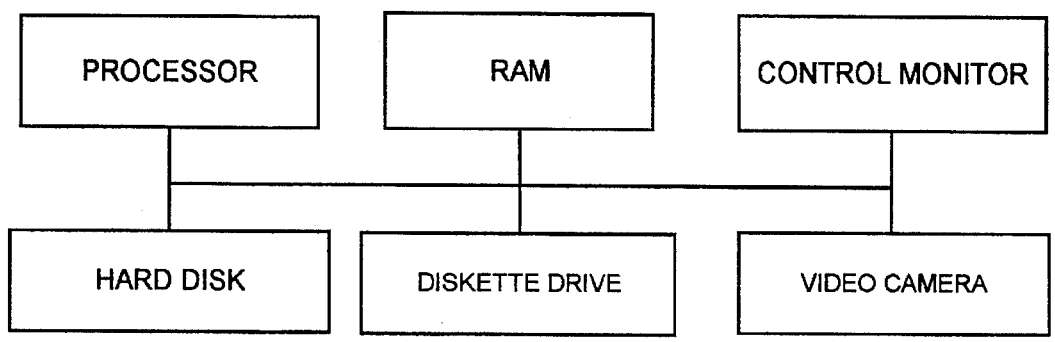
FIG 1C illustrates a number of hardware components of the system.

The preferred control computer can be any PC-compatible control computer having at least the following capabilities, a 80486-based, 32 bit processor, 66 MHz performance, zero wait state, 8 megabytes RAM memory; a disk control, 214 megabyte, 16 msec hard disk; 3.5 inch diskette drive, 1.44 megabytes; a time clock with calendar and battery back up; a VGA standard graphic adaptor and display interface; a dual RS-232 Serial Interface, a parallel printer interface; and MS-DOS operating system, and MS Windows. The preferred control monitor can be a VGA standard, 17" having a display resolution of 1024×768, or a VGA standard 20" having a display resolution of 1280×1024. The preferred video camera can be a monochrome CCIR or RS-170 solid-state CCD, such as a Sony XC-75, a RGB color triple-chip solid state video camera, such as a Sony DXC-930P, or a high resolution monochrome camera, such as a Kodak Megaplus. These components are illustrated in FIG. 1B. The preferred software program that can be used is Quantimet Image Processing Software (QUIPS). With QUIPS, a routine sequence of instructions can be created to perform repetitive image analysis tasks. More specifically, QUIPS allows for the recordation of an image analysis option that can record a sequence of image analysis operations (called a "routine") which can be run on a computer. The routine can be used to create application solutions which can be repeatedly used by other users of the system without any specialist knowledge of the system's operation. *QUIPS Reference Manual* available from Leica Cambridge Ltd., Cambridge, CB1 3QH, England, hereby incorporated by reference. This software can be purchased as part of the Quantimet 600 system which is available from Cambridge Ltd., Clifton Road, Cambridge CB1 3QH England. In addition to the above equipment, a printer is usually needed. Any type of computer printer can be used so long as it can support the Print Manager file of MS-WINDOWS. For example, a Hewlett Packard Model Laserjet IV could be used.

Once the seedlings are ready for testing, the plug flat or photograph is placed under the video camera. Either a black and white or color video camera can be used. The video camera is used to generate a live image of the sample of seedlings. The video camera transmits the image to the control monitor. The control monitor has an image of a stationary grid on its screen. The stationary grid is in the form of small boxes or cells. The live image is aligned with the stationary grid. More specifically, the image is aligned so that each of the seedlings is inside only one of the boxes or cells.

Sometimes the live image will contain some spots, specs or other distortions. In these instances, the computer is used to smooth over and/or modify the image so that a clearer, more readily analyzable image can be obtained. For examples, spots and specs can be removed by looking at the pixels surrounding the spots and specs and instructing the computer to make the spots and specs the same color as the surrounding pixels or by having the computer average the spots, specs and surrounding pixels into the same color.

The live image of the seedlings on the monitor is used to generate an image of the seedlings. From the generated images, the control computer calculates the vigor rating.

More specifically, from the generated images, the control computer measures the total surface area of all of the leaves in the plug flat or photograph. The measurement can be made in $mm^2$. The computer calculates the standard deviation surface area of the leaves open (in $mm^2$) and the germination percentage of the seedlings. The computer calculates the germination percentage by calculating the total number of seedlings in the grid and dividing this by the number of squares or cells in the grid. This number is then multiplied by 100 to provide the germination percentage.

The germination percentage could be calculated in a number of ways. For example, the germination percentage can also be determined by having the computer look at each seedling in a cell individually. The computer then calculates the leaf surface area of each of the seedlings and compares it with a predetermined fraction of the mean leaf surface area of the seedlings (calculated by dividing the total leaf surface area of the seedlings by the number of seedlings). The computer then determines the germination percentage by determining the proportion of seedlings which have a leaf surface area greater than the predetermined fraction (e.g. 60%) of the mean leaf surface area. The computer then calculates the leaf area of each of the seedlings and compares it with the leaf area of a commercially usable seedling from the same crop. The computer then determines the percentage of seedlings having a leaf area of at least 70% of the average leaf area of the commercially usable seedling.

In addition, the computer can be programmed to take into account certain characteristics known to exist in a particular crop when calculating the germination percentage. For example, petunias are known to produce albino seeds. Albino seeds result in seedlings having white leaves. The computer could be programmed either to count or not count seedlings having white leaves when determining the germination percentage. A similar procedure could be used for plants that are too large or small, too yellow, etc.

The vigor rating is determined by dividing the total surface area of the leaves by the standard deviation of the leaves and multiplying this by the germination percentage. The formula for calculating the vigor rating can be incorporated into the programming of the control computer or instead calculated by hand using a calculator.

A computer program suitable for use in the method of this invention could be constructed by routine programming by a computer programmer of ordinary skill in the art. For example, FIGS. 7A–7D illustrate a computer program written with the software QUIPS available from Cambridge, Ltd., Clifton Road, Cambridge CB1 3AH, England. This program can be programmed into a control computer and used in the method of this invention.

If the program illustrated in FIGS. 7A–7D is programmed into a control computer, the method of this invention is conducted as follows.

The person conducting the testing works with the image analysis equipment to supply the information and parameters needed to calculate the vigor rating. The first step is that the person conducting the test places a plug flat, photograph, or digital image of the sample seedlings under a video camera. The camera does not have to be any specific distance from the plug flat. All that is required is that camera and lens have the flat in focus. Once the flat is in focus it is calibrated by measuring with a ruler to see how much area is covered by a pixel. The pixel measurement is usually made in millimeters, however, other units of measurement such as centimeters and inches could be used. For example, if the program illustrated in FIGS. 7A–7D is used, a pixel covers 0.409982 square millimeters. See FIG. 1. The plug flat can be placed on a photostand under the camera or placed on a conveyor system that moves underneath the camera. After placing the plug flat under the video camera, the person (i.e. user) conducting the test positions himself in front of the control computer. FIGS. 1A and 1B illustrate a flow chart of the relevant portion of the computer program utilized for interaction between the programmed control computer and the user. Preferably, the control computer is programmed with the above-described software, QUIPS.

The user logs on to the system by providing a password, keyword or the like which is used in connection with an access control system. After verifying that the user is authorized to access the image analysis system, the system displays a "Display" window and a "Tools" window. The user checks that he is using the "QUIPS" software. The user then goes to the "Tools" window and selects "Run". The system displays a "Routine Header" window. The user then selects "File". Once the file window is opened, the user selects "Open". The user selects, i.e. enters, the file for the specific crop and variety being tested, such as for petunias, impatiens, pansies etc. The computer then displays a "Routine Header" window having the selected file name located at the top of the window. If the file name is not correct, then the user must start over and select the correct file for the specific crop and variety being tested.

Once the file name is correct, then the user selects "Continue". The system may display the "Feature Histogram" window. If the "Feature Histogram" window is displayed, the user checks the numbers of the X-axis and Y-axis of the histogram to make certain that these numbers are correct for the crop being tested. If the numbers are not correct then the user can input the correct numbers. If the numbers are correct, the user then selects "Continue".

Next, the computer displays a live image of the seedlings in the plug flat and a "Camera Set Up" window. It is at this point that the user can adjust various features on the camera, such as aperture, zoom and focus, if needed to improve the live image. Once the user is finished with the "Camera Set Up" window, the user presses "Continue".

After the "Camera Set Up" window, the computer displays a window containing a stationary grid which is calibrated in millimeters along with the live image. The user aligns the seedlings in the plug tray with the stationary grid. Once the tray is properly aligned, so that a complete and clear image of the entire plug tray is properly positioned to the grid, the user presses "Continue".

Next, the computer displays an image of what it has detected as plant material from the acquired image. The computer also displays a "Color Detect" window which contains stored numbers for the hue, saturation and intensity for the particular crop and graphs of hue, saturation and intensity based on the live image. The user checks the stored numbers for hue, saturation and intensity. If the stored numbers are not correct for the particular crop and variety being tested, then the user may input the correct numbers.

Figure 8:
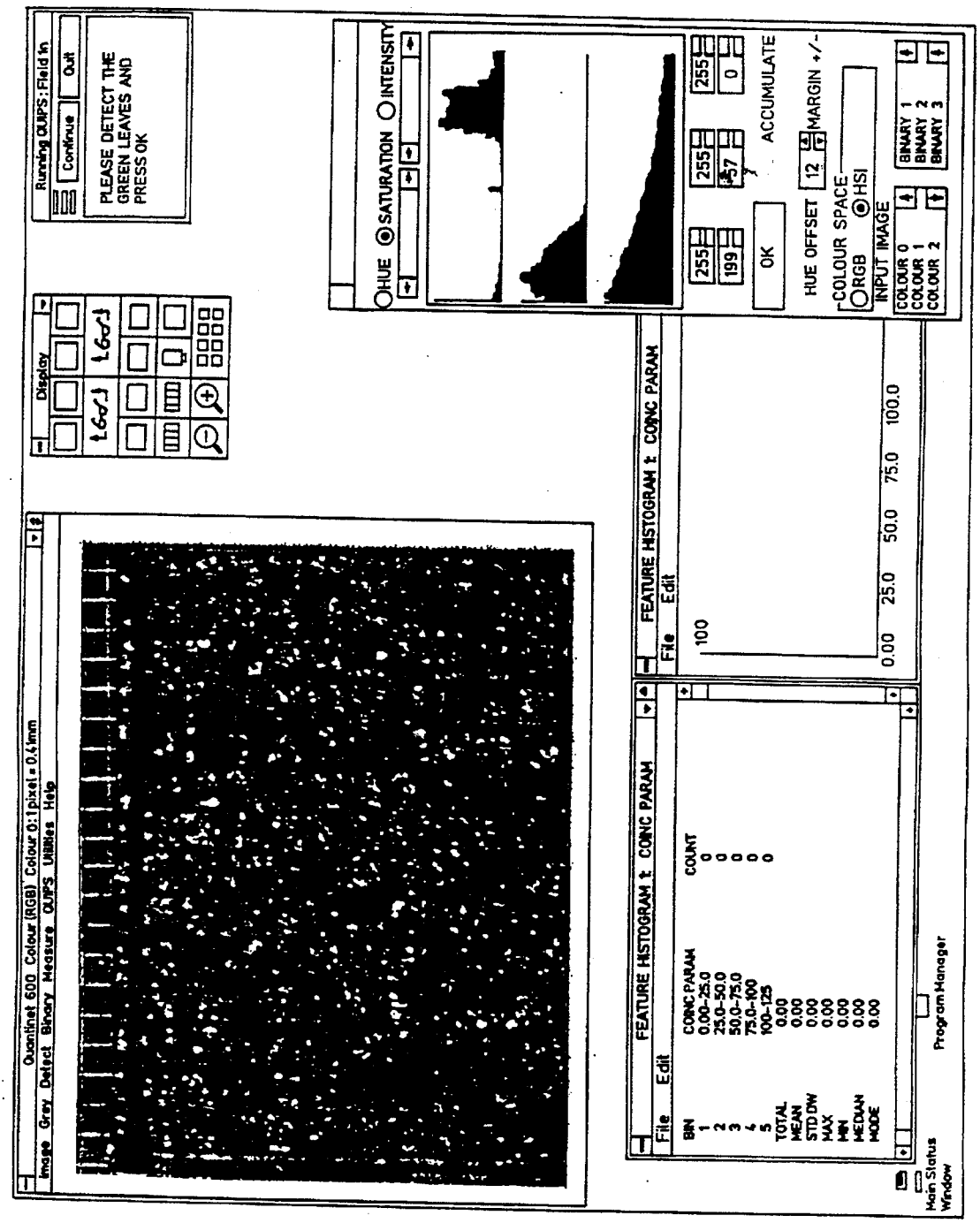
FIG. 8 is a print-out of a control monitor screen showing the "Color Detect" window and graphs for hue, saturation and intensity. The Figure also shows bars to the left of the hue and saturation graphs which can be adjusted if the computer is not detecting the seedlings.

At this point, the user might notice that the computer has only partially detected some or all of the seedlings. If this is the case, the user must adjust the bars to the left of the hue and saturation graphs (See FIG. 8).

In addition to the problems with detection, the user might notice that some editing is required of the detected image. If so, the user can use the "Binary Edit" window, which is found in the "Tools" window under "Edit". The "Binary Edit" window has several editing and "Undo editing" features. For example, if the user notices that two seedlings in the image are overlapping or touching, he can select "Cut" from the "Binary Edit" window. Advantageously, the use of the "Cut" feature allows the user to draw a line between two detected seedlings thereby instructing the computer to treat them as separate objects.

The user can also select "Draw" in the "Binary Edit" window to draw an outline of a seedling which is undetected by the computer but visible on the acquired image. The user can also delete an entire object which has been detected using the "Delete" function. The "Delete" function is also found in the "Binary Edit" window and is useful when perlite or vermiculite, i.e. growing medium particulate, has been mistakenly detected as plant material by the computer.

The user can also use the "Erase" function in the "Binary Edit" window to draw a circle or rectangle around an object to erase. The "Edit" function is useful if two seedlings are located in the same cell and the user wishes to delete one from the acquired image.

The "Binary Edit" window also contains an "Undo" function which erases any and all editing. If the "Undo" function is used, the user will have to reenter all editing after selecting "Undo".

In any event, once the editing is completed, the user presses "Continue". Next, the computer displays an "Image Utilities" window. The user then presses "Masked Copy" and then "Ok". By pressing "Masked Copy" a black and white image of the live image is created.

After the "Image Utilities" window disappears, the computer displays an "Input Loop" window. At this point, the user can use the "TV and Masked Copy Functions" located in the display window to flip between the live image and the black and white image to determine if problems occurred on the masked copy. If the user discovers problems, he may input the number "1" into the "Input Loop" window to reacquire a new image, or he may input the number "2", to redetect the acquired image. If the user does not wish to reacquire a new image or redetect the acquired image, then he may press "Continue".

After the "Input Loop" window, the computer displays a "Input Sampid$" window. The user may then enter the lot number located on the flat if needed.

Next, the computer displays an "Input Sow" window. The user may enter the sow date and vision date. The sow date is the date when the seed was planted. The vision date is the date that the vigor testing is being conducted.

The computer then displays a "Input Variety$" window. The user may enter the specific variety name (or other suitable description) of the crop being is tested.

Next, the computer displays an "Input Rep$" window. The user enters the "Rep" number. The Rep number is the number of the specific repetition of the test.

Figure 2:
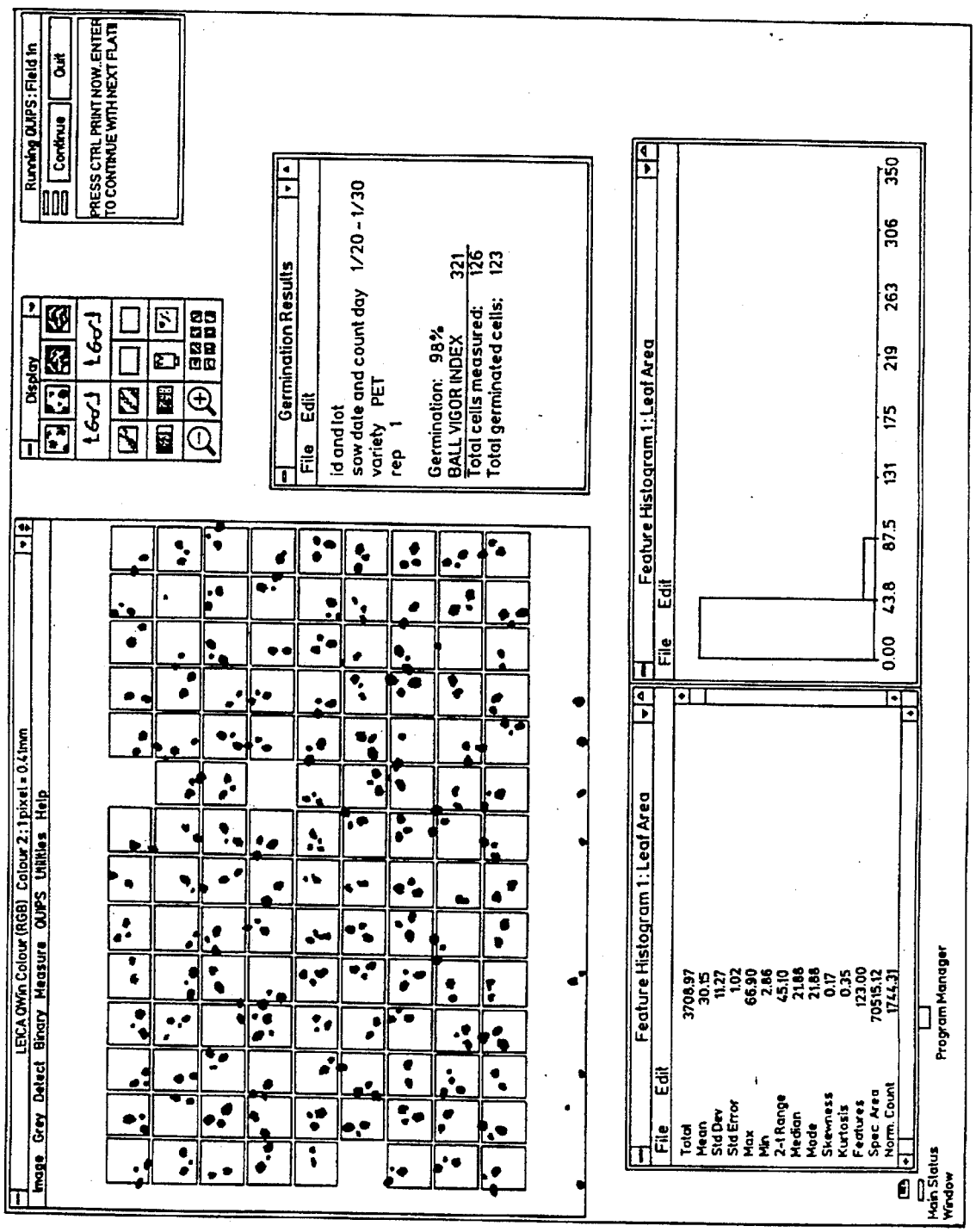
FIG. 2 is a print-out of a control monitor screen after the determination of the vigor rating for a plug flat of seedlings. The figure shows that a control computer has measured the surface area of the leaves of the seedlings, calculated the standard deviation of the leaves and the germination percentage.

Finally, the computer displays the "Germination Results" window. In the "Germination Results" window the computer displays the germination percentage it has calculated for the flat, as well as the vigor rating for the specific seed lot being sampled and tested. In addition, the screen may also display two "Feature Histogram" windows. One of the "Feature Histogram" windows contains a bar graph which shows how many seedlings are of a particular size range. The other window displays the measurement of the surface area of the leaves and the standard deviation of the leaves. The window may also contain various other measurements as well, such as the mean leaf area, the maximum leaf area in a cell, the minimum leaf area in a cell, the median leaf area, etc. See FIG. 2.

It is important to note that various program subroutines can be added to enhance the generated image. For example, one can use the "Gaussian" command which is a form of image smoothing which uses a Gaussian kernel to give less blurring of the image. The "Laplace 1" command can be used to detect edges in an image by performing a Laplace transform using 4 neighboring pixels. The "Laplace 2" command uses 8 neighboring pixels.

Once the printing is complete, the user presses "Continue" and the present system asks whether the user wishes to go back to the stationary display grid and line up another plug flat of seedlings for vigor testing or instead log off of the system.

The typical time it takes for the control computer to determine the vigor rating for a flat of seedlings is approximately one minute. It has been found that there are no special requirements or training required for the user. The user can be trained to conduct the vigor rating in about ½ hour, for example.

The vigor rating obtained by the computer is then evaluated against a standard vigor rating scale assembled via correlation studies with other seedlings from the same crop sown in other commercial facilities across the United States. Then, based upon where the vigor rating falls on the scale, the quality of the seed lot is determined. The quality of the seed lot is then recorded. The vigor rating can also be evaluated against the vigor rating of flats run earlier in the day, week, etc.

Depending on the vigor rating determined with the method of the present invention, a particular seed lot may not be sold, or more importantly, or if so, they are first labelled to properly reflect a sub-par vigor rating. For example, a vigor rating that does not give a grower 90% usable seedlings may not be considered commercially acceptable or instead, may only command a lesser price for the seeds when sold. This 90% rating was developed based on information from other greenhouses. Vigor ratings are then correlated within individual commercial facilities. Since the conditions within a greenhouse are similar for all varieties or seed lots grown within that greenhouse and because the vigor rating is independent of specific critical conditions, a grower can then make correlations within his greenhouse which will hold true for crop to crop and year to year. This is extremely beneficial for growers for the following reasons. For example, say a grower decides he wants to sow 100,000 plants. Say the grower knows the vigor rating and the quality of the seed lot. Based upon this information, the grower can: (1) sow all 100,000 seeds based upon his confidence in the quality of the lot; (2) sow the 100,000 seeds plus a buffer based upon the quality of the seed lot and how many seeds he believes will not make it; or (3) sow double the lot of seeds.

It has also been found that seeds collected from seedlings having a high vigor rating as determined by the method of this invention have a higher shelf life. More specifically, different varieties of seeds having different vigor ratings were collected and stored in normal seed storage conditions for five months. Then, the seeds were planted in a plug tray and their vigor rating obtained every month through use of the present invention. The seeds were also tested using the standard plug test of the prior art. As a result of this testing, the inventor discovered that the higher the vigor rating of the seedlings, as determined by the present invention, the higher and better the shelf life of the seeds collected from the resulting plants. By contrast, that shelf life test result could not be correlated to, i.e. determined from, the prior art type vigor test. The main problem with the prior art tests is that these tests simply estimate whether or not the seed lot will be good in six months or twelve months. Because there is no quantified measure of seed vigor, these prior art tests are essentially a pass or fail type of aging test.

Also contemplated for use in this invention are image analysis systems which use more than one camera at more than one angle. Such image analysis systems generate three-dimensional images. If such a system is used, however, the leaf area is measured in $mm^3$ instead of $mm^2$.

In order that the present invention may be more fully understood, the following examples are given by way of illustration.

EXAMPLE 1

Figure 3:
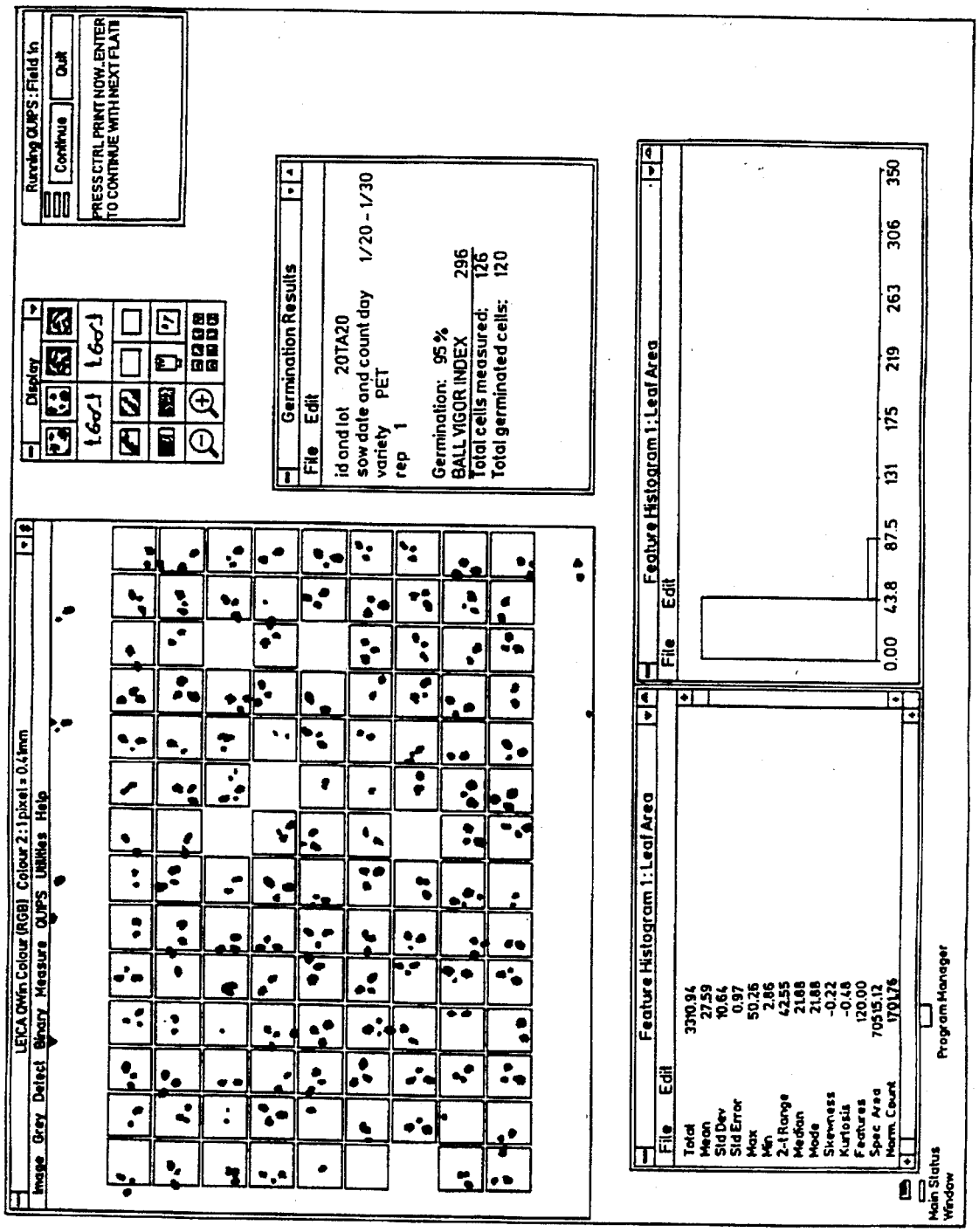
FIG. 3 is a print-out of a control monitor screen after the determination of the vigor rating for a plug flat of petunia plants.

FIG. 3 shows the results of vigor testing on a plug flat of petunia plants named "Madness Burgundy". This test was run on Jan. 20, 1995. First, petunia seeds were sown in a plug tray and grown until seedlings appeared and the leaves unfolded. The plug flat was then placed under a video camera. The vigor rating was determined using a control computer programmed with the program as illustrated in FIGS. 7A–7D. The results are shown in FIG. 3 which shows that two "Feature Histogram" windows are displayed. One of the "Feature Histogram" windows displays the results of the measurement of the total surface area of the leaves, which was 3310.94 $mm^2$. The standard deviation of the leaf area is also displayed, which was 10.64 $mm^2$. The "Germination Results" window displays the germination percentage of the flat as well as its vigor rating. The vigor rating is indicated under the heading "BALL VIGOR INDEX" (note that "BALL", Ball Vigor Index, and BVI (Ball Vigor Index) are trademarks of the assignee of the subject invention). The vigor rating is given as 296. "Total cells measured" is the total sample size. In this example it is 126 seeds per test. The "Total germinated cells" is the number of seedlings in the grid.

EXAMPLE 2

Figure 4:
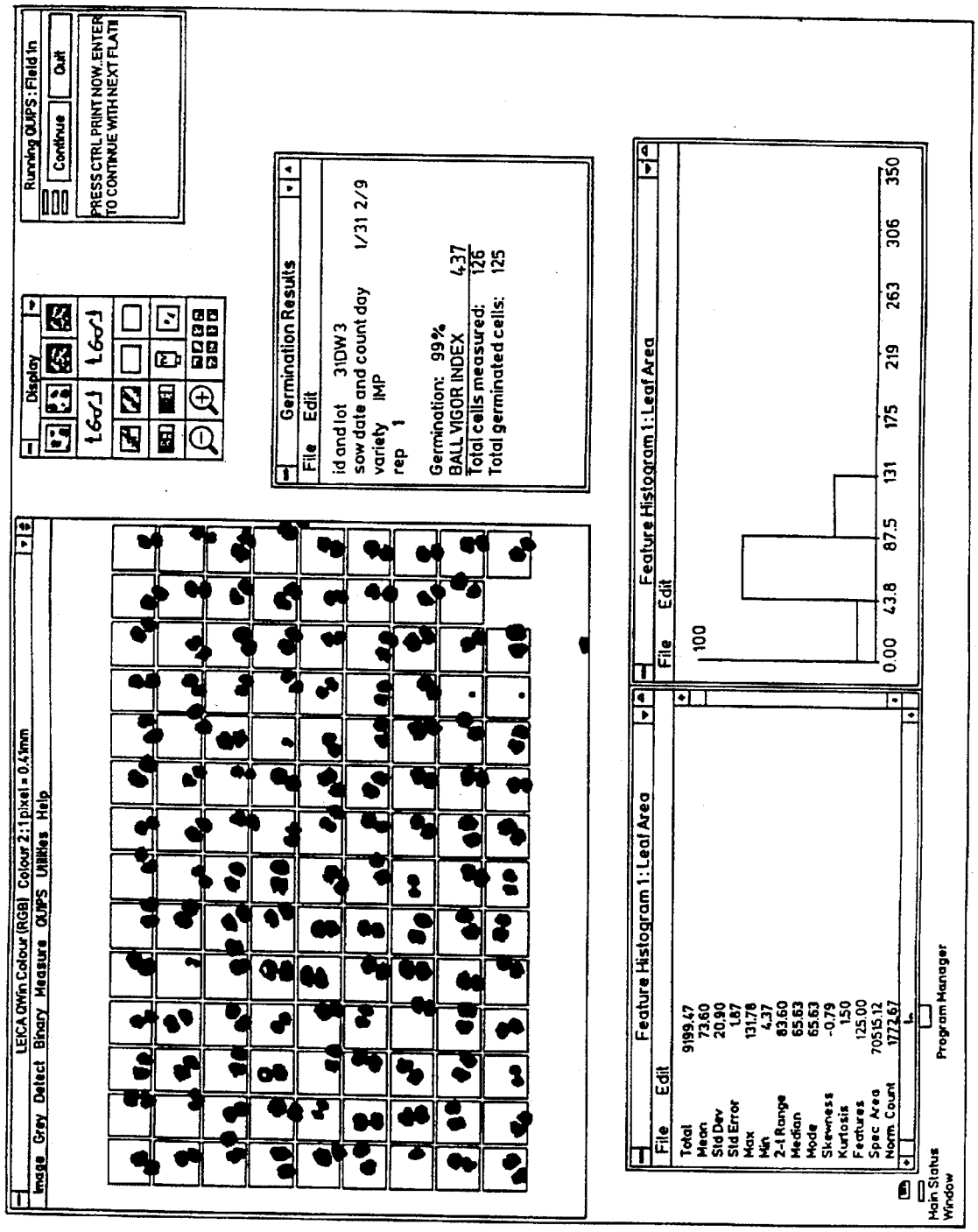
FIG. 4 is a print-out of a control monitor screen after the determination of the vigor rating for a plug flat of a different variety of impatiens plants.

FIG. 4 shows the results of vigor testing on a flat of impatiens plants named "Super Elfin Blush" (Trademark). Such impatiens seeds were sown, grown and placed under a video camera as in Example 1. The control computer was programmed with the program of FIG. 7. The test was run on Jan. 31, 1995. The surface area of the leaves was 9199.47 mm$^2$ The standard deviation was 20.90 mm$^2$. The germination percentage is 99%. The vigor rating was 437.

EXAMPLE 3

Figure 5:
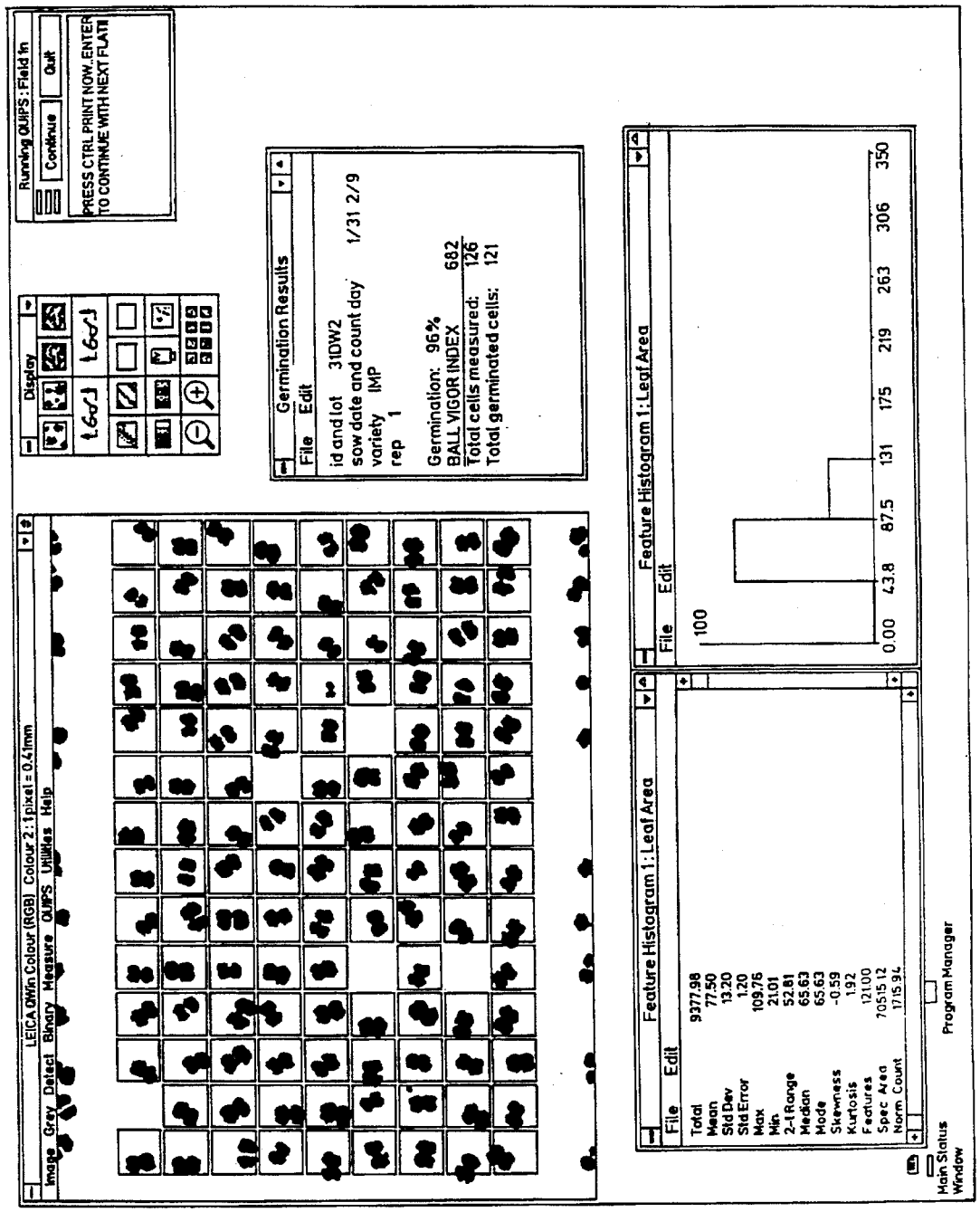
FIG. 5 is a print-out of a control monitor screen after the determination of the vigor rating for a plug flat of impatiens plants.

FIG. 5 shows the results of vigor testing another flat of "Super Elfin Blush" (Trademark) impatiens plants. As in Example 2, impatiens seeds were sown, grown and placed under a video camera. The control computer was programmed with the program of FIG. 7. The testing was also run on Jan. 31, 1995. The surface area of the leaves was 9377.98 mm$^2$. The standard deviation was 13.20 mm$^2$. The germination percentage is 96%. The vigor rating was 682 which is higher then the vigor rating determine for the plug flat per Example 2. Customers offered a choice between the seed lots of this example and Example 2 would pick the seed lots of this example because of the higher vigor rating. The seed lots of this example would perform better for the grower than the seed lots of Example 2 under any type of growing conditions. The seed lots of this example will store longer and will germinate better than the seed lots of Example 2.

EXAMPLE 4

Figure 6:
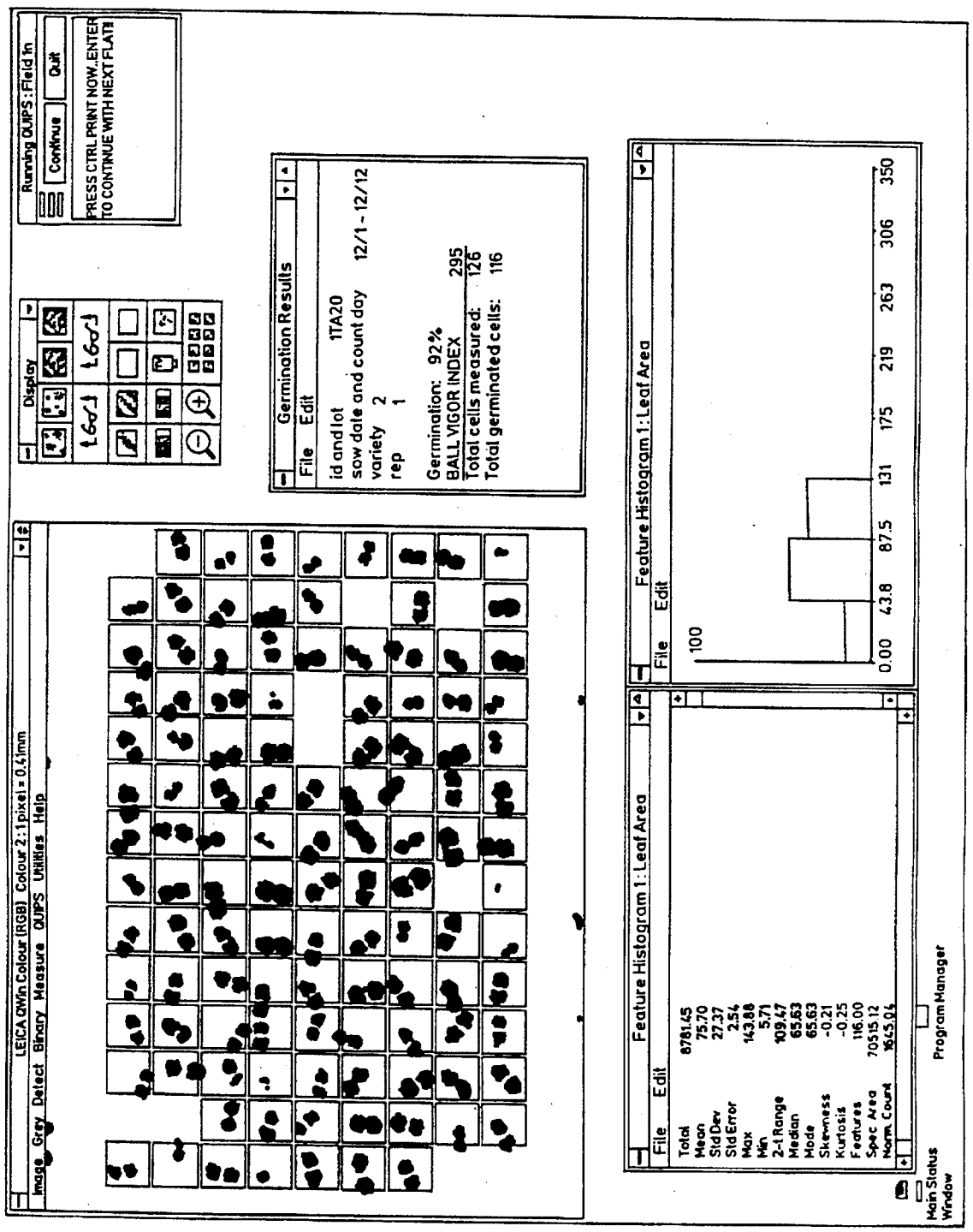
FIG. 6 is a print-out of a control monitor screen after the determination of the vigor rating for a plug flat of pansy plants.

FIG. 6 shows the results of vigor testing on a flat of pansy plants named "Maxim Marina" (Trademark). Pansy seeds were sown, grown and placed under a video camera as in Example 1. The control computer was programmed with the program of FIGS. 7A–7D. This test was run on Dec. 2, 1994. The surface area of the leaves is 8781.45 mm$^2$ The standard deviation was 27.37 mm$^2$. The germination percentage is 92%. The vigor rating was 295.

Although the invention has been described primarily in connection with the special and preferred embodiments, it will be understood that it is capable of modification without departing from the scope of the invention. The following claims are intended to cover all variations, uses, or adaptions of the invention, following, in general, the principles thereof and including such departures from the present disclosure as come within known or customary practice in the field to which the invention pertains, or as are obvious to persons skilled in the field.

I claim:

1. A method of determining the quality of a seed lot of a crop, said method comprising the steps of:

(a) generating an image of a plurality of seedlings grown from a plurality of seeds selected from a seed lot;

(b) determining the leaf surface area of each of the seedlings from said image;

(c) determining the total leaf surface area of the seedlings from said image;

(d) determining a surface area threshold relating to the leaf surface areas of a plurality of the seedlings;

(e) determining the proportion of the seedlings which have a leaf surface area that exceeds said surface area threshold; and (f) generating an indication of seed quality based upon said proportion determined in said step (e).

2. The method of claim 1 wherein said step (d) comprises the steps of:

(d1) determining the mean leaf surface area of the seedlings; and (d2) determining said surface area threshold by multiplying the mean leaf surface area determined in said step (d1) by a predetermined percentage.

3. The method of claim 1 wherein said step (a) comprises the step of generating a live image.

4. The method of claim 1 additionally comprising the step of displaying said image on a monitor.

5. The method of claim 4 additionally comprising the steps of generating an image of a grid pattern having a plurality of grid pattern cells on said monitor.

6. The method of claim 5 additionally comprising the step of aligning the grid pattern image and the image of the seedlings such that each of the seedlings resides in a respective grid pattern cell, with no more than one seedling residing in each grid pattern cell.

7. The method of claim 6 additionally comprising the step of editing the aligned grid pattern image and the image of the seedlings to eliminate overlap of leaf surfaces between grid pattern cells.

8. The method of claim 1 additionally comprising the steps of:

(g) sowing a plurality of seeds of said seed lot in a medium capable of supporting seedling growth; and (h) growing the seeds until seedlings appear and leaves of the seedlings unfold.

9. The method of claim 8 wherein said step (h) comprises the step of growing the seedlings under unstressed growing conditions.

10. The method of claim 8 wherein said step (h) comprises the step of growing the seedlings under greenhouse conditions.

11. The method of claim 8 wherein said step (h) comprises the step of growing the seedlings in a plug flat.

12. The method of claim 8 wherein said step (h) comprises the step of growing the seedlings under stressed growing conditions.

13. The method of claim 12 wherein said stressed growing conditions are selected from the group consisting of conditions of light deprivation, conditions of insufficient growth space, unfavorable humidity conditions, and unfavorable temperature conditions.

14. The method of claim 8 wherein said method is carried out least twice at different lengths of time after sowing.

15. The method of claim 1 wherein said seed quality indication is generated based on the proportion of seedlings having leaf surface areas which are at least 90% of said surface area threshold.

16. The method of claim 1 additionally comprising the steps of:

(g) calculating the standard deviation of the leaf surface areas;

(h) determining the proportion of sown seeds that produced seedlings; and (i) calculating a vigor rating for the lot of seeds according to the following equation:

$$\text{vigor rating} = \frac{\Sigma LSA}{SD} \cdot G$$

wherein ΣLSA is the total leaf surface area of the seedlings, SD is the standard deviation of the leaf surface areas, and G is the proportion of seeds that produced seedlings.

17. The method of claim 16 including the step of comparing the vigor rating against a standard scale of vigor ratings of seeds of the same crop.

18. The method of claim 16 including the step of comparing the vigor rating to the vigor ratings of samples of seeds of the same crop.

19. A method of determining the quality of a seed lot of a crop, said method comprising the steps of:
  (a) generating an image of a plurality of seedlings grown from a plurality of seeds selected from a seed lot;
  (b) determining the leaf surface areas of a plurality of the seedlings from said image;
  (c) determining a leaf surface area threshold based on the leaf surface areas determined in said step (b);
  (d) comparing the leaf surface area of one of the seedlings with said leaf surface area threshold;
  (e) repeating said step (d) for a plurality of the seedlings; and
  (f) generating a quality indication based on the number of the seedlings which have a leaf surface area greater than said leaf surface area threshold.

20. The method of claim 19 additionally comprising the step of determining the mean leaf surface area of the seedlings from said image, wherein said step (c) comprises the step of determining said leaf surface area threshold based on said mean leaf surface area.

21. The method of claim 19 additionally comprising the step of generating a visual display of the image of the seedlings.

22. The method of claim 19 additionally comprising the step of generating a visual display having individual images of the seedlings arranged in a two-dimensional array and a plurality of boundaries separating the seedlings.

23. A method of determining the quality of a seed lot of a crop, said method comprising the steps of:
  (a) generating an image of a plurality of seedlings grown from a plurality of seeds selected from a seed lot;
  (b) determining the mean leaf surface area of the seedlings from said image; and
  (c) generating a quality indication based on said leaf surface area, said step (c) comprising the steps of:
    (c1) comparing the leaf surface area of one of the seedlings with a predetermined fraction of said mean leaf surface area;
    (c2) repeating said step (c1) for each of the seedlings; and
    (c3) generating said quality indication based on the proportion of the seedlings which have a leaf surface area greater than said predetermined fraction of said mean leaf surface area.

24. A method of determining the quality of a seed lot of a crop, said method comprising the steps of:
  (a) generating an image of a plurality of seedlings grown from a plurality of seeds selected from a seed lot;
  (b) determining the individual leaf surface area of each of the seedlings from said image;
  (c) determining the total leaf surface area of the seedlings from said image;
  (d) determining a leaf surface area threshold relating to a plurality of the seedlings based upon said total leaf surface area; and
  (e) generating a quality indication based on said individual leaf surface areas and said leaf surface area threshold.

25. The method of claim 24 additionally comprising the step of determining the mean leaf surface area of the seedlings from said image, wherein said step (d) comprises the step of determining said leaf surface area threshold based upon said mean leaf surface area.

26. The method of claim 24 wherein step (e) comprises the steps of:
  (e1) comparing the leaf surface area of one of the seedlings with said leaf surface area threshold;
  (e2) repeating said step (e1) for each of the seedlings; and
  (e3) generating said quality indication based on the proportion of seedlings which have a leaf surface area that surpasses said leaf surface area threshold.

27. The method of claim 24 additionally comprising the step of generating a visual display of said image of the seedlings.

28. The method of claim 24 additionally comprising the step of generating a visual display having individual images of the seedlings arranged in a two-dimensional array and a plurality of boundaries separating the seedlings.

29. An apparatus for determining the quality of seeds, comprising:
  means for generating an image of a plurality of seedlings grown from a plurality of seeds;
  means for determining the leaf surface areas of said plurality of seedlings from said image;
  means for determining a leaf surface area threshold based on a plurality of said leaf surface areas; and
  means for generating a quality indication based on said leaf surface areas and said leaf surface area threshold.

30. The apparatus of claim 29 additionally comprising means for determining the mean leaf surface area of the seedlings.

31. An apparatus for determining the quality of seeds, comprising:
  means for generating an image of a plurality of seedlings grown from a plurality of seeds;
  means for making a surface area measurement of said leaves of a plurality of the seedlings from said image comprising means for determining the mean leaf surface area of the seedlings; and
  means for generating a quality indication based on said surface area measurement, wherein said means for making said surface area measurement comprises:
    means for comparing the leaf surface areas of each of the seedlings with a predetermined fraction of said mean leaf surface area; and
    means for generating said quality indication based on the proportion of the seedlings which have a leaf surface area greater than said predetermined fraction of said mean leaf surface area.

32. An apparatus for determining the quality of a seed lot of a crop, said apparatus comprising:
  means for generating an image of a plurality of seedlings grown from a plurality of seeds selected from a seed lot;
  means for determining the individual leaf surface area of each of the seedlings from said image;
  means for determining the total leaf surface area of the seedlings from said image;

means for determining a leaf surface area threshold relating to a plurality of the seedlings based upon said total leaf surface area; and means for generating a quality indication based on said individual leaf surface area and said leaf surface area threshold.

33. A method of generating a quality indication relating to seedling quality, said method comprising the steps of:

(a) generating an image of a plurality of seedlings grown from a plurality of seeds;

(b) determining the individual leaf surface area of each of the seedlings from said image;

(c) determining a leaf surface area threshold based on the individual leaf surface areas of a plurality of the seedlings; and (d) generating said quality indication based on one of said individual leaf surface areas and said leaf surface area threshold.

34. The method of claim 33 additionally comprising the step of generating a visual display having individual images of the seedlings arranged in a two-dimensional array and a plurality of boundaries separating the seedlings.

35. A method of generating a quality indication relating to seedling quality, said method comprising the steps of:

(a) generating an image of a plurality of seedlings grown from a plurality of seeds;

(b) determining the individual leaf surface area of each of the seedlings from said image;

(c) determining a leaf surface area threshold based on the individual leaf surface areas of a plurality of the seedlings;

(d) generating said quality indication based on said individual leaf surface areas and said leaf surface area threshold;

(e) generating a visual display having individual images of the seedlings arranged in a two-dimensional array and a plurality of boundaries separating the seedlings;

(f) determining the mean leaf surface area of the seedlings and displaying said mean leaf surface area on said visual display;

(g) determining the median leaf surface area of the seedlings and displaying said median leaf surface area on said visual display;

(h) determining the minimum leaf surface area of the seedlings and displaying said minimum leaf surface area on said visual display; and (i) determining the maximum leaf surface area of the seedlings and displaying said maximum leaf surface area on said visual display.

36. An apparatus for generating a quality indication relating to seedling quality, said apparatus comprising:

means for generating an image of a plurality of seedlings grown from a plurality of seeds;

means for determining the leaf surface areas of said plurality of seedlings from said image;

means for determining a leaf surface area threshold based on a plurality of said leaf surface areas; and means for generating said quality indication based on one of said leaf surface areas and said leaf surface area threshold.

37. The apparatus of claim 36 additionally comprising means for generating a visual display having individual images of the seedlings arranged in a two-dimensional array and a plurality of boundaries separating the seedlings.

38. An apparatus for generating a quality indication relating to seedling quality, said apparatus comprising:

means for generating an image of a plurality of seedlings grown from a plurality of seeds;

means for determining the leaf surface areas of said plurality of seedlings from said image;

means for determining a leaf surface area threshold based on a plurality of said leaf surface areas;

means for generating said quality indication based on said leaf surface areas and said leaf surface area threshold;

means for generating a visual display having individual images of the seedlings arranged in a two-dimensional array and a plurality of boundaries separating the seedlings;

means for determining the mean leaf surface area of the seedlings and displaying said mean leaf surface area on said visual display;

means for determining the median leaf surface area of the seedlings and displaying said median leaf surface area on said visual display;

means for determining the minimum leaf surface area of the seedlings and displaying said minimum leaf surface area on said visual display; and means for determining the maximum leaf surface area of the seedlings and displaying said maximum leaf surface area on said visual display.

* * * * *

UNITED STATES PATENT AND TRADEMARK OFFICE
CERTIFICATE OF CORRECTION

PATENT NO. : 5,659,623
DATED : AUGUST 19, 1997
INVENTOR(S) : ROBERT CONRAD

It is certified that error appears in the above-identified patent and that said Letters Patent is hereby corrected as shown below:

Column 8, lines 62-67, please delete "The computer then calculates the leaf area of each of the seedlings and compares it with the leaf area of a commercially usable seedling from the same crop. The computer then determines the percentage of seedlings having a leaf area of at least 70% of the average leaf area of the commercially usable seedling."

Column 13, line 45, please delete "is" and insert --was-- in lieu thereof.

Column 13, line 46, please delete "is" and insert --was-- in lieu thereof.

Signed and Sealed this

Twelfth Day of May, 1998

*Attest:*

BRUCE LEHMAN

*Attesting Officer*     Commissioner of Patents and Trademarks